United States Patent [19]

Moriarty

[11] Patent Number: 4,770,567
[45] Date of Patent: Sep. 13, 1988

[54] ROUGHING CUTTER

[75] Inventor: George V. Moriarty, Troy, Mich.

[73] Assignee: Colt Industries Operating Corp., West Hartford, Conn.

[21] Appl. No.: 505,687

[22] Filed: Jun. 20, 1983

[51] Int. Cl.⁴ ............................................. B26D 1/12
[52] U.S. Cl. .................................. 407/59; 407/63
[58] Field of Search ........................ 407/53, 54, 59, 63

[56] References Cited

U.S. PATENT DOCUMENTS

| Re. 26,544 | 3/1969 | Castor | 407/53 |
|---|---|---|---|
| 2,855,657 | 10/1958 | Erhardt | 407/63 |
| 3,548,476 | 12/1970 | Cave et al. | 407/59 |
| 3,775,819 | 12/1973 | Ribich | 407/53 |
| 4,083,643 | 4/1978 | Parone | 407/59 |
| 4,174,915 | 11/1979 | Peetz et al. | 407/63 |
| 4,212,568 | 7/1980 | Minicozzi | 407/63 |
| 4,285,618 | 8/1981 | Shanley | 407/63 |

FOREIGN PATENT DOCUMENTS

| 62693 | 10/1982 | European Pat. Off. | 407/53 |
|---|---|---|---|
| 55067 | 5/1977 | Japan | 407/59 |
| 992719 | 5/1965 | United Kingdom | 407/59 |

Primary Examiner—Nicholas P. Godici
Attorney, Agent, or Firm—Remy J. VanOphem

[57] ABSTRACT

A roughing cutter (14) has a generally cylindrical shank (16) with a plurality of lands (22) and angular flutes (20) with resharpening lips (32) separating the lands. A plurality of straight-crested cutting teeth (24) are formed on the lands with radial relief. Each tooth has a straight cutting edge (28) generally perpendicular to the radial direction. The orientation of the cutting edge permits it to be in parallel relationship to a surface of a workpiece while in cutting engagement. Each tooth has S-shaped side walls (34, 36) with rounded upper portions which are respectively tangential to the crest of the tooth. The rounded upper portions result in reduced power consumption during machining. The teeth of the roughing cutter may be formed by an axially advancing milling cutter with a sloping cutting edge segment (58) and adjoining rounded segments (60, 62).

3 Claims, 4 Drawing Sheets

ROUGHING CUTTER

TECHNICAL FIELD

This invention relates to roughing cutters and more particularly to roughing cutters having straight-crested teeth.

Background Art

Roughing cutters have received wide acceptance since their introduction to this country because of their capability to remove metal more efficiently (i.e., with less energy consumption) than conventional cutters. Essentially, the roughing cutters efficiency is attributable to the shape of the chips produced and the manner in which the chips are formed.

A popular form of roughing cutter is exemplified in U.S. Pat. No. 3,117,366. The cutter of this patent has a sinusoidal (wavy) tooth form on the cutting edges which is offset from one flute to the next on a lead. While a cutter as depicted in this patent has great efficiency, it cannot produce a smooth surface finish.

Another known type of roughing cutter has a tooth form embodying straight-crested teeth. This latter variety of cutter is advantageous in that it produces a smooth surface finish but tends to consume more energy in a cutting operation than the previously described cutter. U.S. Pat. No. 4,083,643 shows a roughing cutter having straight-crested teeth with tangential cutting edges adapted to produce a surface finish superior to that of a standard cutter with round crested teeth.

DISCLOSURE OF THE INVENTION

A roughing cutter of the invention combines the beneficial attributes of a roughing cutter having a sinusoidal tooth form and a roughing cutter having straight-crested teeth. In accordance with the invention, a roughing cutter is provided with teeth having a radially outer straight cutting edge generally perpendicular to the radial direction in which the leading and trailing edges of the cutting edge respectively adjoin rounded upper side wall portions to reduce the amount of energy required to remove material. In addition, the rounded edges permit a cutter of the invention to attain a surface finish which is smoother than that which is obtainable with a cutter having conventional round crested teeth.

In addition, a roughing cutter of the invention may incorporate flutes with resharpening lips on the back sides thereof to facilitate resharpening such that constant geometry and concentricity may be maintained from flute to flute.

Accordingly, it is a primary object of the invention to provide a roughing cutter having straight-crested teeth with leading and trailing edges which adjoin rounded side walls.

Another object is to provide a roughing cutter with a resharpening lip.

These and other objects and advantages of the invention will become more readily apparent from the following detailed description when taken in conjunction with the accompanying drawings, in which:

BEST MODE OF CARRYING OUT THE INVENTION

Figure 1:
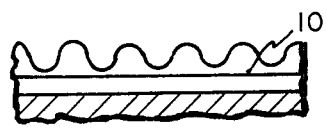
FIG. 1 is a linearized representation of a prior art sinusoidal roughing cutter tooth form.
Figure 2:
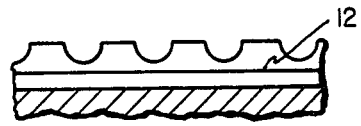
FIG. 2 is a linearized representation of a prior art straight-crested roughing cutter tooth form.

With reference to FIGS. 1 and 2, there are shown respective tooth profiles 10 and 12 of a conventional roughing cutter having a sinusoidal tooth form and a less efficient conventional roughing cutter having a straight-crested tooth form. It will be noted that the rounded crests of the teeth of FIG. 1 blend smoothly with the grooves between the teeth whereas the crests of the teeth of FIG. 2 form well-defined angles with the grooves. Such pronounced transitions between the crests of the teeth and grooves of FIG. 2 have an adverse effect on power consumption and the finish of a machined surface.

Figure 4:
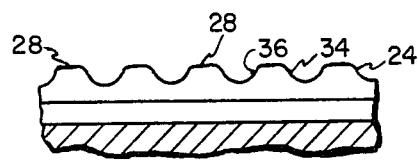
FIG. 4 is a view of adjacent cutting faces on a land, taken generally along the line 4—4 of FIG. 3.
Figure 3:
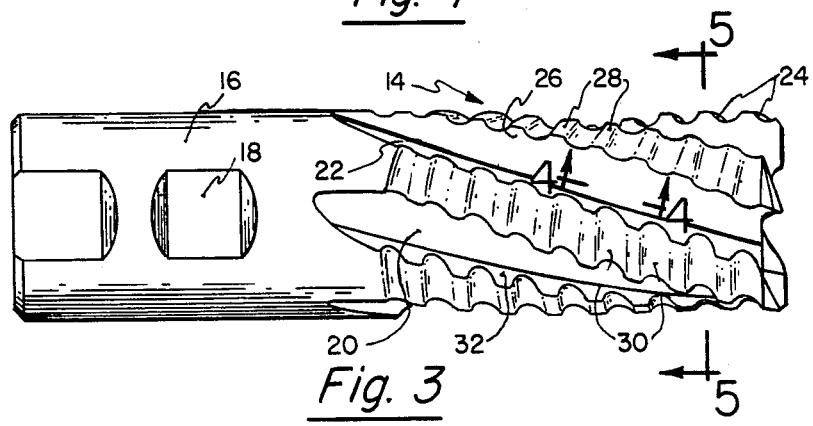
FIG. 3 is a side elevational view of an end mill according to the invention.
Figure 5:
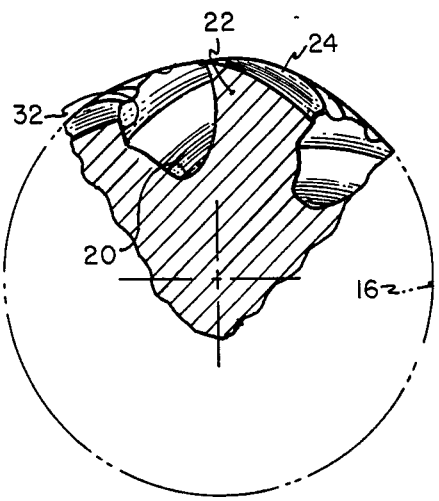
FIG. 5 is a transverse sectional view of the end mill of FIG. 3, taken along the line 5—5 thereof.

FIGS. 3-5 show a roughing cutter of the invention in the form of an end mill 14. The end mill 14 has a generally cylindrical shank 16 having a flat 18 for securing the tool to the tool holding mechanism of a cutting machine. The cutting portion of the end mill 14 is provided with a plurality of parallel helical flutes 20 which define and separate a plurality of lands 22. The flutes 20, depicted in FIG. 3, are disposed so as to form, for example, a 20° helix angle. Upon each of the lands 22 are fashioned a series of straight-crested radially relieved teeth 24 with cutting faces 26 and radially outer, straight cutting edges 28 at their advancing ends. Longitudinally spaced grooves 30, which serve to separate the adjacent teeth on a land, form a pattern which is a continuous helical spiral around the circumference of the tool body of the opposite hand to that of the flutes 20 whereby the teeth on successive lands are axially staggered, as is customary in roughing cutters. Alternatively, the grooves could, of course, be disposed in a circumferentially step over or staggered pattern with the axis of each groove perpendicular to the axis of the tool as is known in certain prior art roughing cutters wherein the teeth lie in planes substantially perpendicular to the axis of the tool.

As shown in FIGS. 3 and 5, the rear or trailing faces of a row of teeth 24 are disposed upon a resharpening lip or surface 32 at the back edge of the associated flute. Such a resharpening lip, which is adapted to engage a finger, facilitates resharpening whereby constant geometry and concentricity may be more readily maintained from flute to flute. It will be appreciated that the maintenance of constant geometry and concentricity is essential to ensure that each land will cut similarly sized chips. The manner of machining the flutes 20 on the shank 16 is described hereinafter.

In accordance with the teachings of U.S. Pat. No. 4,083,643 the cutting edges 28 of the teeth 24 are tangential to the periphery of the end mill such that the cutting edges 28 are generally perpendicular to the radial direction. The tangential cutting edges contribute to the generation of a smooth surface finish as is set forth in detail in the aforementioned patent. However, in contradistinction to the tooth form depicted in U.S. Pat. No. 4,083, 643, the leading points and trailing points of the cutting edge 28 of a tooth 24 (designated A and B, respectively) merge smoothly with the respective S-shaped side walls 34 and 36 thereof, whereby cutting efficiency is enhanced. In fact, the cutting edge 28 is tangential to both of the side walls 34 and 36, whereby there is no abrupt transition from the radially outer cutting edge 28 to either of the side walls 34 and 36.

Figure 6:
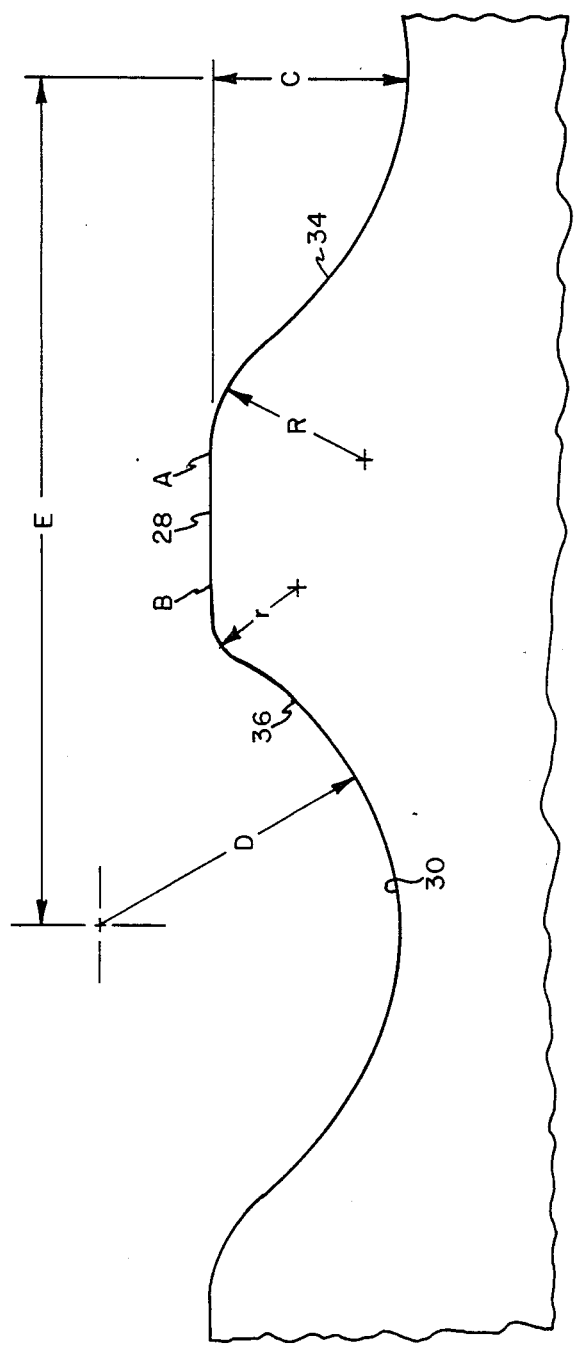
FIG. 6 is an enlarged view of the tooth form of the end mill of FIG. 3.

Referring to FIG. 6, which shows an enlarged tooth profile, it will be seen that the cutting edge 28 is tangential to the upper portions of side walls 34 and 36 which respectively have radii of curvature R and r, with the radius R being larger than the radius r. The radius R should preferably be as large as possible commensurate with other design factors, in order to minimize power consumption. Since the rounded upper portion of the side wall 36 contributes far less to cutting efficiency than the rounded upper portion of the side wall 34, the radius r may be somewhat smaller than the radius R. Of course, both rounded upper side wall portions foster smooth finishes on machined parts.

It will be noted that in FIG. 6 certain dimensions of the tooth profile are represented by certain letters, viz.: the depth of each tooth is represented by the letter C, the radius at the bottom of the grooves 30 is represented by the letter D and the center to center distance between the root of adjacent teeth is represented by the letter E. It will, of course, be appreciated that the dimensions selected for a given tool will depend upon the application and that the dimensions can be determined mathematically. However, for purposes of illustration only, it has been found that acceptable results may be obtained from a two inch, eight fluted end mill having the following approximate dimensions, which are given in inches:

R—0.0410
r—0.0200
C—0.0535
D—0.0830
E—0.2260

A preferred method of manufacturing a roughing cutter of the invention involves providing a fluted shank and subsequently cutting the teeth thereupon. This process is described in detail in U.S. Pat. No. 4,083,643 and reference should be had thereto for a more complete description thereof. While other methods of manufacture may be suitable, the method disclosed in the patent is believed to be most advantageous.

Figure 7:
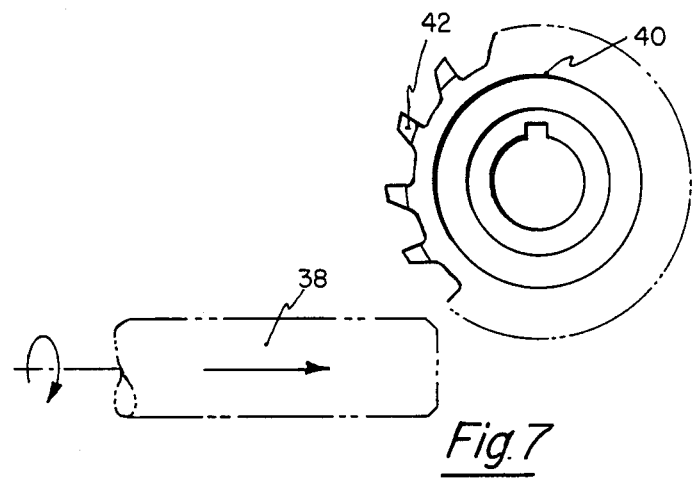
FIG. 7 is a side elevational view of a milling cutter machining a flute on a shank outlined in phantom.

As shown in FIG. 7, a cylindrical steel shank or workpiece 38, is axially advanced relative to a milling cutter 40 while simultaneously being rotated. The milling cutter 40 cuts a flute in the shank 38 having a predetermined helix angle. The shank is then indexed before a further flute is machined thereinto. This process continues until all the flutes have been machined onto the shank 38 whereby the shank is prepared for the teeth to be formed thereupon.

Figure 8:
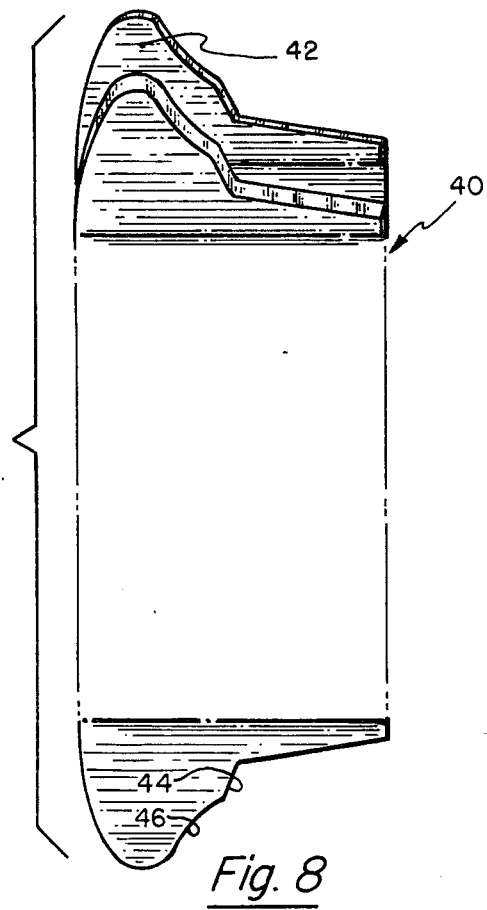
FIG. 8 is a front elevational fragmentary view of the milling cutter of FIG. 7.

The milling cutter 40 is depicted in FIG. 8 where the shape of the cutting teeth 42 thereof may be observed. It will be noted that each tooth 42 has an upper side wall segment 44 which merges with a lower straight side wall segment 46 whereby the resharpening lip 32 may be defined on the back side of a flute 20. The resharpening lip 32 is, of course, oriented such that a finger of a grinder may be engaged therewith.

Figure 9:
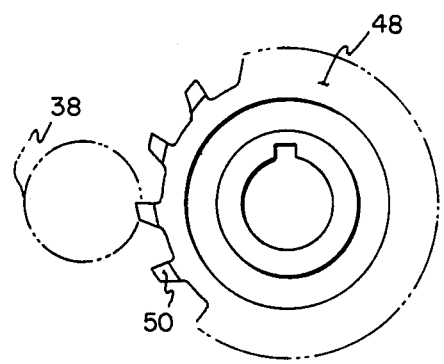
FIG. 9 is a side elevational view of another milling cutter, adapted to form the teeth and grooves of the end mill shown in FIG. 3, machining a fluted shank outlined in phantom.

FIG. 9 shows the previously machined tool 38 having teeth cut therein by a milling cutter 48. The cutter 48 moves transversely of the tool shank 38 in a reciprocating motion while the tool is rotated about its axis and simultaneously axially advanced. The relative transverse movement is for radially relieving the form of the teeth (FIG. 5) while the axial and rotational movement provides the selected lead between the teeth of succeeding lands. This method of forming teeth is described in greater detail in U.S. Pat. No. 4,083,643.

Figure 10:
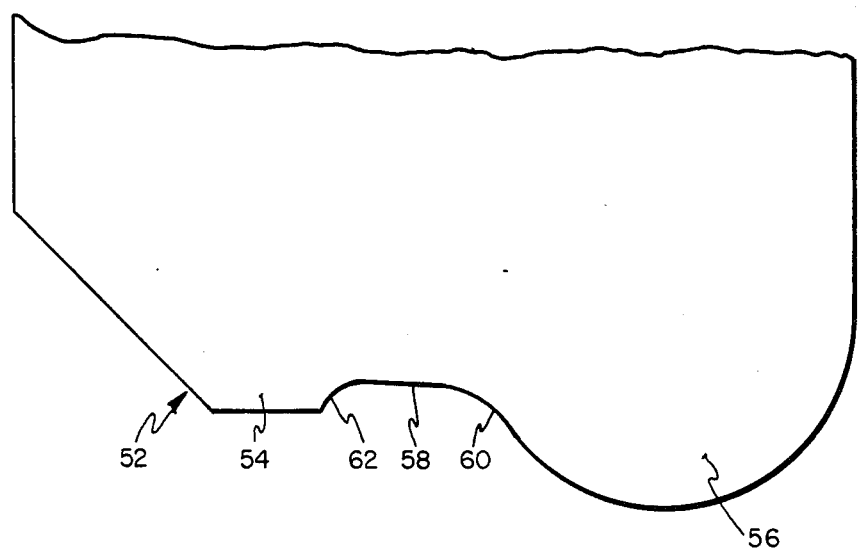
FIG. 10 is a front elevational outline of a tooth of the milling cutter of FIG. 9.

Referring to FIG. 10, with continued reference to FIG. 9, it will be seen that the cutter 48 has a plurality of circumferentially spaced teeth 50 which are relieved behind the cutting edge 52. As is best shown in FIG. 10, the cutting edge 52 has two segments which respectively define two projections 54 and 56 which have a radial depth greater than the straight cutting edge segment 58 formed therebetween and are adapted to machine the grooves. It will be noted that the projection 54, which has a lesser radial depth than projection 56, is adapted to make an initial cut whereas projection 56 is adapted to make a finishing cut. It can be seen that the cutting edge segment 58 is straight and is inclined toward the axis of rotation of the cutter 48. It is the cutting edge segments 58 on the respective teeth which form the crests of the teeth 24 of the end mill such that the cutting edges 28 of the end mill are tangential thereto. The manner of determining the angle of inclination of the cutting edge segment 58 which will yield the desired tangential cutting edge 28 is set forth in U.S. Pat. No. 4,083,643. It will also be observed that the cutting edge embodies two rounded segments 60 and 62 which are disposed on either side of the segment 58 and merge smoothly therewith. It is, of course, the rounded segments 60 and 62 which cut the upper portions of the side walls 34 and 36 so as to form the radii R and r, respectively, thereupon. In addition, the rounded segment 62 is adapted to fashion a rounded upper side wall portion which merges smoothly with the lower side wall portion as cut by the outboard part of the projection 56.

Obviously, many modifications and variations are possible in light of the above teachings without departing from the scope or spirit of the invention as defined in the appended claims. For example, the invention may be applied to shell type and other forms of roughing cutters.

I claim:

1. In an improved roughing cutter of the type comprising: a generally cylindrical form having a plurality of lands and angular flutes separating the lands, a plurality of straightcrested cutting teeth formed on each of the lands with a selected lead angle formed between the teeth of adjacent lands, each tooth having radial relief and a cutting face at its advancing end with a leading point and a trailing point, each cutting face having a straight cutting edge defined between the leading and trailing points such that the cutting edge of each tooth is substantially perpendicular to the radial direction, the improvement comprising:

each tooth having an S-shaped side wall adjacent to the leading point, with an upper rounded portion tangential to the cutting edge.

2. The improvement of claim 1, further comprising: each tooth having an S-shaped side wall adjacent to the trailing point with an upper rounded portion tangential to the cutting edge, the first mentioned upper rounded portion having a radius of curvature greater than that of the second mentioned upper rounded portion.

3. The improvement of claim 2, further comprising: a resharpening lip formed on the back side of each flute for engagement by the finger of a resharpening grinder whereby maintenance of constant geometry and concentricity from flute to flute will be facilitated.

* * * * *

UNITED STATES PATENT AND TRADEMARK OFFICE
CERTIFICATE OF CORRECTION

PATENT NO. : 4,770,567

DATED : September 13, 1988

INVENTOR(S) : George V. Moriarty

It is certified that error appears in the above-identified patent and that said Letters Patent is hereby corrected as shown below:

On the Title Page, Item [73] Assignee:, should read --Colt Industries Inc., New York, N.Y.--.

Column 4, line 7, after "tool" insert --shank--.

Signed and Sealed this

Fourth Day of April, 1989

Attest:

DONALD J. QUIGG

Attesting Officer

Commissioner of Patents and Trademarks